United States Patent Office 3,250,836
Patented May 10, 1966

3,250,836
METHOD FOR THE MANUFACTURE OF ARTIFICIAL STONES AND OTHER SHAPED BODIES FROM MINERAL SULFUROUS MATERIALS
Leo Torsten Ulfstedt, Stockholm, Sweden, assignor to Casius Corporation Limited, Montreal, Quebec, Canada
No Drawing. Filed July 20, 1962, Ser. No. 211,388
Claims priority, application Sweden, May 22, 1962, 5,748/62
9 Claims. (Cl. 264—82)

The present invention pertains to a method for the manufacture of artificial stones and other shaped bodies from mineral sulfurous materials. More particularly, the invention relates to a method for the manufacture of steam-cured shaped bodies from finely divided particles of sulfurous mineral materials, in which, after shaping them into said bodies, they are treated with steam in an autoclave at temperatures between 100° and 250° C.

The use of mineral sulfurous materials for the manufacture of artificial stones and other shaped bodies is known. In this connection, a finely divided, generally moist or wet mass of the sulfurous mineral material, alone or generally admixed with a mineral binder, which may also be sulfurous, is first converted into shaped bodies of desired dimensions. Thereafter these shaped bodies are subjected to a steam treatment at a high temperature to accelerate the reactions in the mass which result in the mineral particles being bound together and the final strength of the bodies being thus attained.

As mineral sulfurous materials, mention should primarily be made of those materials which have their sulfur bound in the form of *sulfide*, such as basic blast-furnace slag (content of sulfur in the range from 0.1 to 2 percent, and usually from 0.5 to 1.2 percent), and slags from the combustion of fuels in piece form, such as ashes from locomotives, but also ashes of bituminous sediments. This latter generally contains a certain amount of pyrite and so-called shales which have their sulfur bound as pyrite, $FeS_2$, iron sulfide, $FeS_2$, and also as elementary sulfur, S. How the materials mentioned above have their sulfur combined has probably not been sufficiently investigated. Especially the structure of glassy materials (blast furnace slag) is difficult to define. One property which these materials have is that under hydrothermal conditions they tend to undergo hydrolysis with formation of hydrogen sulfide.

The hydrogen sulfide thus formed has proved to be agressive with respect to the heat hardening apparatus, substantially consisting of steel, but also of other metals or metal alloys such as copper and brass. In addition to pressure vessels (autoclaves) which are usually in the form of long tubes of one to three meters in diameter, there is generally included supporting plates or moulds for carrying the shaped bodies, as well as trucks for the latter and rails for the movement of the trucks. All these details form such a complicated system that the continuous protection against corrosion by a surface treatment capable of enduring the hydrothermal conditions will be most troublesome and expensive to attain.

After investigations carried out in connection with the present invention, it has been found that the metal sulfide primarily formed on account of the reaction of the hydrogen sulfide liberated in the steam hardening process will form, on the metal surfaces of the apparatus exposed thereto, a continuous tight layer thereon which represents, in itself, an excellent protection against further corrosion. This rule has, however, proved to be valid only with the proviso that *elementary oxygen* is not present in the pressure vessel during the *hydrothermal process* for under the conditions prevailing during this process the oxygen tends to oxidize the sulfur and sulfide compounds into acids which have a considerably greater tendency towards dissociation than $H_2S$, such as sulfuric acid and sulfurous acid. This reaction takes place, for the main part, in the atmosphere of the autoclave and produces more aggressive acids which will, of course, strongly attack the free metal surfaces. This is especially so since the metallic salts of these acids show a good solubility in water and thus do not, like the sulfides, sometimes form layers capable of resisting a continued attack. But in the presence of oxygen sulfide protective layers perhaps already formed on the metal surfaces will be decomposed with oxidation into sulfites and sulfates not capable of forming layers.

There are examples of steam hardening plants, the steel of which after one year in operation has been eaten up to half the original thickness of the material causing an explosion at the expense of human lives.

According to the present invention, the disadvantages referred to can be avoided, wholly or substantially wholly, if, prior to the beginning of the steam hardening process, the pressure vessel is *evacuated to a sufficiently low pressure* to render the interior of the pressure vessel and of the shaped bodies substantially free from elementary oxygen.

In connection with the manufacture of steam-cured macroporous shaped bodies of light-weight concrete, it is, of course known, prior to the treatment of the shaped bodies with pressure steam in an autoclave, to lower the pressure in the autoclave before introducing the steam, with the aim of removing the air from the shaped bodies. In these prior methods the purpose is to facilitate the penetration of steam into the macroporous shaped bodies, while the purpose according to the present invention is to solve a most troublesome corrosion problem in connection with the steam curing of shaped bodies manufactured from sulfurous raw materials. These shaped bodies need not necessarily have been rendered macroporous in connection with the shaping operation, for example, by the use of gas-producing or foaming agents.

According to one embodiment of the invention, it is possible, especially when the mass is wet or moist, to produce an increased temperature exceeding, for example 40° C., in the interior of the shaped bodies. When the pressure in their interiors passes below the pressure of saturated steam at the temperature prevailing in the shaped bodies, an evaporation of water will take place. Due to the resulting flow of gases, the removal of the oxygen from the shaped bodies and from the atmosphere of the autoclave will, of course, be considerably facilitated.

One method of increasing the temperature in the interior of the shaped bodies before the steam curing process is to use a binder which is capable of liberating, on binding, a sufficient amount of heat for the interior of the bodies to attain the desired temperature. In this connection, it is possible to use, wholly or partially, materials capable of liberating very great quantities of heat, such as *unslaked lime*. Another method of increasing the temperature in the interior of the shaped bodies is to

*supply heat from external sources* or also, if desired, heat one or more of the starting materials from which the shaped bodies are formed. This would be done with the provision that the steam curing process and the evacuation immediately associated therewith should be carried out while the temperature in the interior of the bodies is still sufficiently high.

The evacuation of the autoclave can be facilitated by heating the autoclave or introducing water therein prior to the steam curing process, so that the strong flow of steam obtained as a result of the evacuation contributes to the washing-off of the oxygen from the autoclave.

In the application of the invention, there is obtained a useful side effect in that the heat transfer from steam, free from air, to a solid body will be considerably more effective than from an air-containing body. Apart from the disadvantages concerning decreased corrosion, the steam curing process will take place more rapidly if the evacuation according to the invention is applied.

The evacuation should advisably take place by a pump insensitive to condensing steam, such as a water ring pump. In comparison with the whole steam-curing plant, the costs for the evacuation unit will be relatively low.

The following examples are given in order to define the invention more precisely, but it is to be understood that the examples are not intended as a limitation of the invention in any way.

Example 1

8 parts of common granulated blast furnace slag are mixed with 2 parts of Portland cement and 1 part of water. The blast furnace slag has a sulfur content of 0.8 percent. The mixture is poured into molds. After the shaped bodies have set slightly due to the hydraulic binding of the cement, the temperature in the interior thereof being about 60° C., they are discharged from the molds and introduced into an autoclave of steel, or metal alloys of which are copper and brass.

Prior to the steam curing process, the pressure in the autoclave is lowered to a value under the pressure of saturated steam at 60° C., that is 150 mm. of mercury. The resulting evaporation of water is permitted to proceed for a short time in order to remove elementary oxygen from the interior of the autoclave, whereupon the steam is turned on. Even after using the autoclave for a long period of time, no injurious corrosion of metal parts can be observed.

Example 2

6 parts of so-called foamed slag, that is blast furnace slag, to which, through a special cooling process, a strongly blistered character has been imparted (sulfur content 1.2 percent), are mixed with 1 part of unslaked lime and water to soil moist consistency. In a manner similar to that usually applied to so-called sand-lime brick, the mixture is converted into shaped bodies by a pressing operation. The latter are charged into an autoclave not especially protected against corrosion, whereupon evacuation and steam-curing take place. Even after using the autoclave for a long time no injurious corrosion can be observed.

Example 3

5 parts of common granulated blast furnace slag (sulfur content 0.5 percent) are mixed with 1 part of finely ground blast furnace slag (specific surface 1,500 to 4,000 cm.$^2$/g.) and water into a mass of a consistency similar to moist soil. The mixture obtained is pressed into hollow blocks in an automatic machine. The latter are charged into a pressure vessel, whereupon evacuation and steam-curing take place. Results as advantageous as those obtained according to the preceding examples are obtained.

Example 4

Shaped bodies of brick size are produced from the following mixture:

4 parts of fly ash (sulfur content 0.1 percent)
1 part of blast furnace slag obtained by grinding together 4 parts of blast furnace slag (0.8 percent sulfur) and 1 part of Portland cement clinkers, and water to a suitable consistency.

Similar good results as in the preceeding examples will be obtained.

Example 5

Bituminous silurian slates are burnt out in a field furnace and the ash is crushed into pieces of nut size and smaller. 6 parts of ash (sulfur content 1.1 percent) are mixed with 1 part of cement, the mixture obtained is made moist and pressed into hollow blocks, whereupon the latter, on storing for 12 hours at room temperature, are charged into an autoclave. The autoclave is evacuated and the steam is turned on to steam cure the blocks.

Similar good result from corrosion viewpoint as in the preceding examples will be obtained.

Example 6

4 parts of expanded clay (granules of clay which have heated rapidly until melting begins and thus been rendered highly porous) are mixed with a wet-ground slurry of 1 part of blast furnace slag (sulfur content 0.8 percent). This mass is pressed into shaped bodies, whereupon the latter are charged into a pressure vessel and steam-cured, the steamcuring process being preceded by an evacuation.

As evident from the above, Examples 1, 2 and 5 relate to shaped bodies in which it is only the aggregate consisting of coarse grains that is substantially the sulfur-containing ingredient. Examples 3 and 4 relate to shaped bodies, in which both the aggregate and the finely divided binder are sulfurous, and example 6 relates to shaped bodies in which it is only the binder which is responsible for the sulfur hydrolyzing during the steam-curing process.

It is to be understood that the invention is not to be limited to the exact details of operation or exact compositions shown and described as obvious modifications and equivalents will be apparent to one skilled in the art, and the invention is therefore to be limited only by the scope of the appended claims.

What I claim is:

1. In a method for the manufacture of steam-cured bodies from a mixture comprising a mineral binder rich in lime, a siliceous material, and water, at least one of the ingredients of said mixture containing sulfur in sulfide-bound form, treating said bodies in a steel autoclave at temperatures between 100 and 250° C., the improvement which comprises evacuating the atmosphere prior to introducing the steam therein to remove elementary oxygen from the autoclave and thereby prevent the oxidation of sulfur and sulfurous compounds liberated in the steam-curing process into corrosion-producing compounds.

2. A method as claimed in claim 1, wherein the evacuation of the autoclave is caused to take place until a sufficiently low pressure is reached to cause water to evaporate in the interior of the shaped bodies, thereby to entrain elementary oxygen to be removed in the evaporated water, and wherein the evaporation process is caused to proceed until the said elementary oxygen has been completely removed from the autoclave.

3. A method as claimed in claim 2, wherein heat is supplied to the shaped bodies prior to the evacuation process.

4. A method as claimed in claim 3, wherein the heat is supplied to the shaped bodies from external sources.

5. A method as claimed in claim 3, wherein the heat is supplied by reacting the mineral binder rich in lime with water.

6. A method as claimed in claim 5, wherein the mineral binder is slaked lime.

7. A method as claimed in claim 3, wherein the heat is derived in part from heat liberated in the exothermic reaction of a binder component.

8. A method as claimed in claim 7, wherein the binder is, at least partially, a material capable of liberating great amounts of heat during binding.

9. A method as claimed in claim 8, wherein the binder is unslaked lime.

References Cited by the Examiner

UNITED STATES PATENTS 2,382,154    8/1945    Jones et al. _____ 106—118

FOREIGN PATENTS 605,359    5/1926    France.

ALEXANDER H. BRODMERKEL, *Primary Examiner.*

MORRIS LIEBMAN, *Examiner.*

A. LIEBERMAN, J. H. WOO, *Assistant Examiners.*